Jan. 31, 1967  R. J. KAUFFMAN  3,301,729
METHOD OF MAKING CELLULAR CORE STRUCTURES
Filed Aug. 12, 1964

INVENTOR
Robert J. Kauffman
BY
Bacon & Thomas
ATTORNEYS

United States Patent Office 3,301,729
Patented Jan. 31, 1967

3,301,729
METHOD OF MAKING CELLULAR CORE
STRUCTURES
Robert J. Kauffman, Plymouth, Mich., assignor to Narad,
Inc., Plymouth, Mich., a corporation of Michigan
Filed Aug. 12, 1964, Ser. No. 389,055
7 Claims. (Cl. 156—252)

This invention relates to a novel method of making cellular core structures from sheet material, and of particular utility in forming such structures of corrugated paper board.

Cellular core structures of corrugated paper board are known and find wide utility in modern industry. In general, these structures comprise a plurality of strips of the material superimposed to form a stack, with spaced areas of adjacent strips being glued or otherwise adhered together. The adhered areas between one strip and an adjacent strip are spaced apart along the length of the strips and the adhered areas between that one strip and an adjacent strip on the other side thereof are intermediate the first mentioned areas so that the stack can then be expanded to define a cellular core structure to which suitable face sheets may be adhered, all in a well-known manner. While the present invention is described with reference to the formation of such structures from corrugated paper board, it is to be understood that the same is of general utility and can be employed to form core structures from other sheet materials. By corrugated paper board applicant has reference to a well-known material comprising continuous face sheets of paper or the like embracing a sheet of corrugated paper therebetween.

The present invention relates to a method of producing such core structures in collapsed form, which may later be expanded to the cellular formation and consists generally of the steps of slitting a plurality of large sheets of the material by providing a multiplicity of slits or cuts therethrough, in parallel relation and extending nearly all the way across a sheet but terminating somewhat short of the opposed edges thereof. The slits thus define parallel strips of material, all joined together at their ends to marginal bands of the sheet. A line of perforations may be formed across the ends of the strips where they join the marginal bands to permit ready separation of the bands from the strips at a later stage. Such perforations are not necessary, however, since the marginal bands can be later separated by sawing or other means. After the sheets are cut as noted above, spots of adhesive are applied to the strips in spaced relation therealong with the spots of adhesive on each succeeding sheet being positioned to fall intermediate the spots on the corresponding strips of the previous sheet so that when the sheets are stacked, one upon the other, the strips are bonded together in staggered areas. Thereafter the marginal bands are separated from the pad of adhered sheets, thus separating the same into individual stacks of strips bonded together in the desired manner and which may thereafter be expanded to form a cellular structure.

Preferably, while slitting and perforating the sheets, they are also provided with spaced pairs of parallel fold lines extending transversely of these slits to facilitate the later expansion into cellular form, by defining the fold lines about which the strips are folded. These fold lines may be scored, perforated, or formed in any other suitable manner, or may be omitted. The spots of glue or other adhesive are applied between the fold lines of the pairs in alternating relation on each strip or in the corresponding positions, if no fold lines are present.

The adhesive material employed to form the aforementioned spots is a hot-melt quick-setting adhesive. A suitable adhesive of the type contemplated is made by the H. B. Fuller Company and is known as #4109 hot-melt adhesive. It is a synthetic resin in hard cake or bulk form but which may be readily melted. The viscosity of this material varies from 8,700 c.p.s. at 250° F. to 900 c.p.s. at 350° F. The time it takes for the material to set may be regulated by the temperature to which the material is heated. The higher the temperature, the thinner the adhesive and the longer it will take to set. However, the setting range is from one to thirty seconds and it is contemplated that the material be heated to such temperature that it will set completely, in from about ten seconds to about 30 seconds, when employed with the present invention. It is contemplated that the adhesive spots be applied to the strips on the sheets by means of a nozzle arrangement, as will be described.

After the adhered pads of a plurality of sheets have been separated into individual stacks of strips, it is further contemplated that the opposed edges of those stacks be passed between sanding drums or the like to form a core of precisely controlled thickness and accurate opposed faces.

It is, therefore, an object of this invention to provide a method of forming cellular core structures, which method results in extremely rapid fabrication and which is unusually economical, thus reducing the cost of the finished product.

Another object is to provide a method as set forth wherein a minimum quantity of the original material is discarded as waste.

Still another object of the invention is to provide a method well adapted for practice by automatic machinery whereby a large quantity of the product may be produced in a minimum of time.

A further object is to provide an article of the type set forth of precisely controlled dimensions and surface characteristics.

Additional and further objects and advantages will become apparent to those skilled in the art as the description proceeds with reference to the accompanying drawings wherein.

Figure 2:
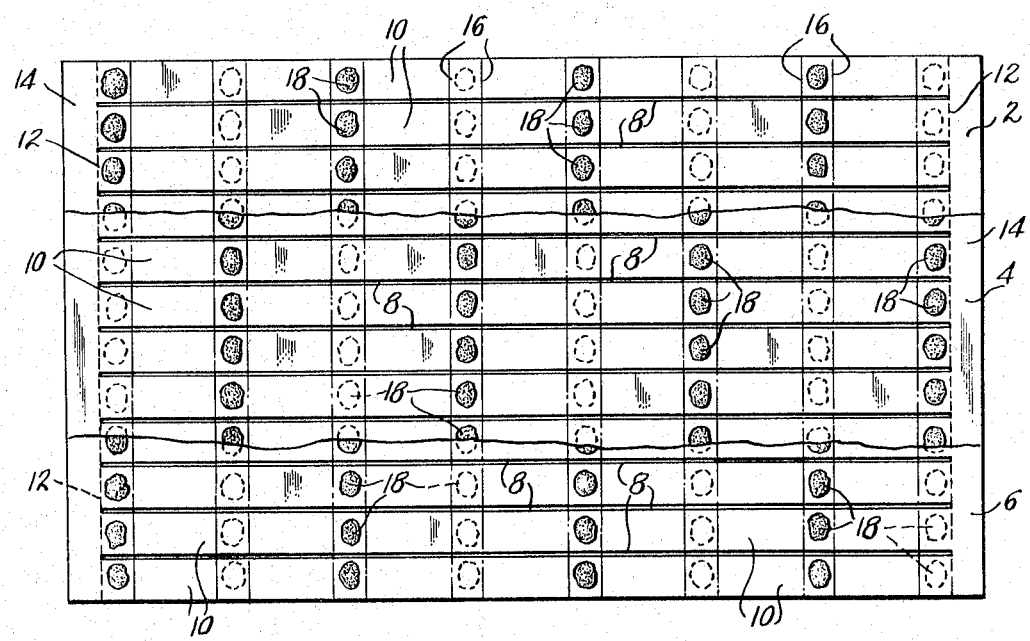
FIG. 2 is a top plan view of a pad of adhered sheets with portions of successive sheets being broken away.

By referring first to FIG. 2, a pad of sheets is shown wherein each of the sheets 2, 4 and 6 are provided with a multiplicity of transverse slits or cuts 8 therethrough thereby dividing each sheet into a multiplicity of similar strips 10. The slits 8 do not extend completely across the sheets but terminate short of the edges thereof along a line generally designated at 12. Thus, leaving uncut marginal bands 14 at each of two opposed edges of each sheet, which are integrally joined to the ends of the strips 10. The lines 12 may be perforated so as to facilitate the later removal and separation of marginal bands 14 from the strips 10 although, as already pointed out, the perforations may be omitted. The sheets 2, 4 and 6 are also provided with a plurality of pairs of parallel fold lines 16 extending thereacross generally perpendicular to the slits 8 and the pairs of fold lines being equally spaced along the length of the strips 10. The fold lines 16 may be crushed fold lines to facilitate the later folding of each strip along those lines or they may be rows of perforations, or omitted entirely. As shown in FIG. 2, the lowermost sheet 2 is provided with spots of adhesive 18 between alternate pairs of fold lines 16 and such spots are provided on each strip. The sheet 4 is also provided with spots 18 of adhesive between alternate pairs of fold lines 16 but it is to be noted that the spots on sheet 4 are in staggered relation to those on sheet 2. That is, they are between the fold lines of the pairs 16, which are not provided with any adhesive on the sheet 2. The sheet 6 is provided with these spots of adhesive between the same pairs of fold lines as on sheet 2. As shown, sheet 4 is superimposed over sheet 2 and sheet 6 is superimposed over sheet 4 so that all their marginal bands 14 and strips 10 are in superimposed registry. As will be obvious, the spaced spots of adhesive are applied to the superimposed strips in such relationship that a stack of adhered strips may then be expanded to define cellular core structures, of known configuration. The number of sheets slit and superimposed in the maner described may vary, depending upon the size of the finished core structure desired. As shown, each of the sheets is provided with spots of adhesive 18 defining continuous rows transverse to the strips 10 but it will be obvious that other patterns of adhesive spots on each sheet may be employed with the same final result.

Figure 1:
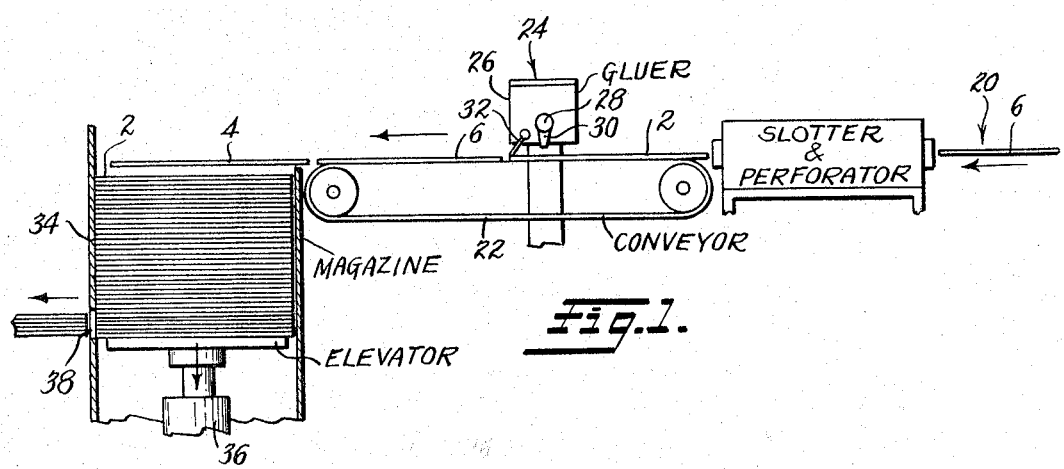
FIG. 1 is a diagrammatic representation of apparatus useful in performing the present method.

Referring now to FIG. 1, uncut sheets of suitable material are advanced, as at 20, into an apparatus labeled in the drawings as "SLOTTER & PERFORATOR" wherein the sheets are provided with the slits 8, the rows of perforations 12 and the transverse score lines 16. After thus preparing each successive sheet, the sheets are fed onto a conveyor 22 where they are advanced toward the left at a uniform rate. It is immaterial whether the sheets be advanced with their slits 8 extending transversely of or longitudinally of their direction of motion, but it is contemplated that they be advanced with the slits 8 extending parallel to the particular movement. The conveyor 22 is operated at a uniform rate of speed to advance the sheets below an apparatus 24 labeled as "GLUER." The apparatus 24 is provided with a suitable housing 26 wherein a supply of the adhesive material is kept at the desired temperature and which includes suitable pumping or pressurizing means to force the hot adhesive through a heated manifold 28 extending transversely across the conveyor 22. Communicating with the manifold 28 are a plurality of heated nozzles 30 directed downwardly and each being directly over a strip 10 of the sheet passing therebeneath. A feeler mechanism 32 detects the leading edge of each sheet and initiates a cycle of operation of the gluer mechanism. Suitable timing and cycling means are provided, not shown, whereby sheet 2 initiates a cycle wherein the nozzles will deposit a spot of glue between the score line 16 of the second pair of score lines of sheet 2 and each alternate pair of score lines thereafter. When the feeler 32 detects the leading edge of the next succeeding sheet (4), it initiates a cycle of operation wherein the nozzles deposit a spot of adhesive between the score lines of the first pair of score lines 16 and each alternate pair thereafter. When sheet 6 reaches the feeler 32, it initiates a cycle identical to that employed on sheet 2.

As is to be noted a relatively small spot of the adhesive is applied in each area, of somewhat less width than the strips 10 and of less width than the spacing between the score lines 16 of each pair. After the adhesive has been applied to the sheets, they are discharged by conveyor 22 and deposited in superimposed relation in a magazine 34. The sides of the magazine are so positioned as to direct the sheets into superimposed registry so that their marginal bands 14 and strips 10 are quite accurately registered. As successive sheets drop into the magazine 34, an elevator mechanism 36 is operated in successive steps to lower the supply of sheets in the magazine through a distance equal to the thickness of one sheet and in timed relation thereto so that the top of the stack is at all times at the same level adjacent the top of the magazine.

Assuming that it is desired to form cellular core structures, each consisting of five strips 10, the gluing mechanism 24 is automatically cycled to deposit glue spots on only the first four sheets and the fifth sheet then passes thereunder without having any adhesive deposited thereon. Thus, when the five sheets have been deposited in the magazine 34, they will all be adhered together but the sixth sheet will not adhere to the fifth and will thus start a new pad.

As shown, the magazine 34 is provided with a discharge opening 38 whereupon each completed pad of five sheets may be removed therethrough when the elevator 36 reaches the position illustrated in the drawing. Reference to five sheets in each pad is, however, merely illustrative since a pad may consist of any desired number of sheets.

By the time a pad of the desired thickness has reached the region of the opening 38, the adhesive material has completely set to its final hardness and the pad is thus securely bonded together. Thereafter all of the marginal bands 14 of the pad are removed in any suitable manner and the pad is thus divided into a plurality of stacks of adhered strips 10.

Figure 3:
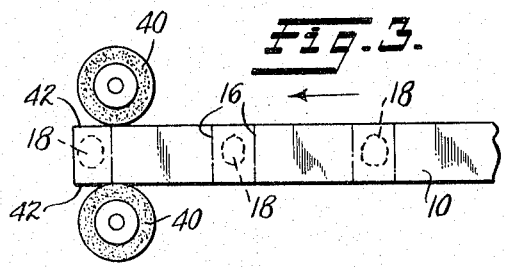
FIG. 3 is a schematic side view of apparatus for performing the final step of the method.

Referring now to FIG. 3, each of the stacks of adhered strips 10 is passed edgewise between a pair of opposite sanding drums 40 to provide opposed edges of the stack with perfectly planar surfaces 42 spaced apart at precisely controlled distances. It must be realized that deposition of successive sheets in the magazine 34 will bring the strips 10 and marginal bands 14 into approximate registry but such registry will not always be exactly precise. Thus, the edges of the strips 10 will not always be in perfect registry and the resulting stack of strips will have undulating opposed edges, not suitable for the formation of accurate panel structures. By employing the sanding step described, those edges are reduced to the exact and proper dimensions and are sized so that all finished edges are in exact registry.

While a single specific exemplary sequence of steps and a single form of apparatus has been described herein, it is to be understood that the same are merely illustrative of the principles of the invention and that other variations of the method and/or apparatus may be resorted to within the scope of the appended claims.

I claim:

1. The method of forming cellular core structures from sheet material, comprising the steps of: forming a plurality of parallel slits in sheets of said material and extending from positions adjacent to but inwardly of one edge of each sheet to positions adjacent to but spaced inwardly from the opposite edge thereof, thereby forming a plurality of strips of material integrally joined at their ends to marginal bands; applying spaced spots of adhesive material along the upper face of each of said strips of each sheet; stacking a plurality of said sheets with their respective strips and marginal bands in super-posed relation to form an adhesively bonded pad of sheets; then separating all said marginal bands from said pad to separate the same into a plurality of stacks of adhesively bonded strips of said sheet material.

2. The method of claim 1 including the step of forming a row of perforations through each sheet along the ends of the strips thereof to facilitate separating said marginal bands from said strips.

3. The method of claim 1 wherein said spots of adhesive are positioned on said strips so that the spots on each strip are between the spots of the strip superimposed thereover in said pad.

4. The method of claim 1 including the step of forming spaced pairs of parallel fold lines across each sheet transversely of said strips, the spots of adhesive being applied to each strip only between alternate pairs of fold lines.

5. The method of claim 1 including the further step of applying a further one of said slitted sheets, without any adhesive on the strips thereof, to the top of said pad before separating said marginal bands.

6. The method of claim 1 wherein said adhesive material is a hot-melt quick-setting adhesive.

7. The method of claim 1 including a final step of sanding opposed edges of said stacks of strips to uniform thickness.

No references cited.

EARL M. BERGERT, *Primary Examiner.*

D. J. DRUMMOND, *Assistant Examiner.*